United States Patent [19]
Richter

[11] Patent Number: 5,547,570
[45] Date of Patent: Aug. 20, 1996

[54] SCREENING DEVICE

[75] Inventor: Ole Richter, Karlstad, Sweden

[73] Assignee: Kvaerner Pulping Technologies AB, Karlstad, Sweden

[21] Appl. No.: 302,691

[22] PCT Filed: Jan. 25, 1993

[86] PCT No.: PCT/SE93/00047

§ 371 Date: Sep. 9, 1994

§ 102(e) Date: Sep. 9, 1994

[87] PCT Pub. No.: WO93/19246

PCT Pub. Date: Sep. 30, 1993

[30] Foreign Application Priority Data

Mar. 17, 1992 [SE] Sweden .................................. 9200808

[51] Int. Cl.$^6$ .............................. D21C 9/04; B01D 29/54; B01D 29/72; B01D 33/00
[52] U.S. Cl. .................... 210/209; 210/333.01; 210/411; 210/331; 210/338; 210/342; 162/251; 68/181 R
[58] Field of Search .............................. 210/198.1, 209, 210/220, 333.01, 323.1, 411, 338, 342, 331; 68/181 R; 162/251

[56] References Cited

U.S. PATENT DOCUMENTS 3,365,065  1/1968  Varjabedian .
4,271,019  6/1981  Galletti .
4,441,224  4/1984  Laakso .
4,793,161  12/1988  Richter et al. .
4,840,047  6/1989  Richter et al. .
4,881,286  11/1989  Richter .
4,971,694  11/1990  Richter .
5,027,620  7/1991  Richter .

FOREIGN PATENT DOCUMENTS 0317771  5/1989  European Pat. Off. .
0377427  7/1990  European Pat. Off. .
0444985  9/1991  European Pat. Off. .

Primary Examiner—Thomas M. Lithgow
Attorney, Agent, or Firm—Cushman Darby & Cushman, L.L.P.

[57] ABSTRACT

A screening device for pulp production includes a cylindrical container for continuous flow-through of a fiber suspension and further includes an inlet to the container and an outlet for the fiber suspension, a moveable support member mounted in the container and which supports hollow screening members for vertical movement; a tubular enclosure open at opposite ends is mounted on the supporting member which enclosure has a moveable piston mounted therein, a hydraulic cylinder being connected to the piston to move the piston in a portion of the enclosure with the hydraulic drive mounted outside of said container with transmission members connected to said supporting member which will therefore absorb the reaction forces generated in moving the piston.

4 Claims, 2 Drawing Sheets

SCREENING DEVICE

FIELD OF THE INVENTION

The present invention relates to a screening device in a standing, preferably cylindrical, container for continuous flow-through of a fibre suspension, wherein the liquid content in the said fibre suspension is altered with the aid of the screening device.

BACKGROUND OF THE INVENTION

Screens of the abovementioned category have been known for a long time. The invention will be illustrated below by referring to a specific field of application for such screening devices, namely the pulp industry and in this regard particularly in connection with the washing of pulp.

Through U.S. Pat. No. 5,027,620 (Kamyr) a screening device of this type is already known which comprises a cylindrical housing with: an inlet and an outlet for pulp, a movable supporting member which supports hollow screening members, means for vertical movement of the said supporting member, a container which is arranged on the said supporting member, which container is open at both ends and has a movable piston member arranged inside it together with means for moving the said piston member. In this known screening device, the drive unit for the vertical movement of said piston member, in the form of an hydraulic piston unit, is arranged inside the housing of the screening device, for moving the piston member. However, this arrangement has been found to entail certain disadvantages, since it has been found difficult completely to avoid leakage of hydraulic fluid, which has a negative effect on the quality of the pulp. Consequently a goal is to attempt to eliminate completely the risk of such leakages.

The solution disclosed in U.S. Pat. No. 4,971,694 (Kamyr) solves the latter problem by placing the hydraulic unit entirely outside the housing of the screening device. However, problems of another type have been found to arise with a device of the latter type. These problems are more related to the design of the apparatus and are due to the fact that the drive unit, which moves the piston member, exerts very large forces. This is because, in such a screening device, relatively large liquid volumes (about 1 m$^3$) have to be moved within relatively short times (about 2 sec). Consequently, rigid structures are needed for mounting the hydraulic unit. In a device according to U.S. Pat. No. 4,971,694, this structure consists of a stout beam which, simply for this reason, has been arranged straight through the housing at its upper end. Despite its relatively generous dimensions, the beam bends markedly when the hydraulic unit is operating, which can be found to be troublesome. For various reasons, therefore, this latter solution cannot be considered to be ideal.

SUMMARY OF THE INVENTION

An object of the present invention is to solve the problems that were initially mentioned above in such a way that the disadvantages arising in association with a solution according to U.S. Pat. No. 4,971,694 are entirely avoided.

This object is achieved with the aid of a screening device, wherein the said means for moving the piston member comprises a drive unit arranged outside the housing, preferably an hydraulic piston unit, from which the reaction forces counteracting the piston member via transmission members act on the supporting member for the screening members.

By using the supporting member for the screening members to absorb the reaction forces from the hydraulic piston unit, the beam according to U.S. Pat. No. 4,971,694 can be eliminated in an economical manner by utilising this rigid structure, i.e. the supporting member for the screening members, present in the screening device.

A further advantage of a solution according to the invention is that the point of application of the reaction forces can be placed in a plane which is in common with the points of application from the hydraulic piston units which drive the supporting member in its reciprocal vertical movement. This eliminates the risk that a piston rod and other transmission members for the centrally located components might be subject to flexural stresses if the supporting member were to tilt to any extent.

BRIEF DESCRIPTION OF THE DRAWINGS

The invention will be explained in more detail below with reference to the attached figures, in which.

DETAILED DESCRIPTION OF THE INVENTION

Figure 1:
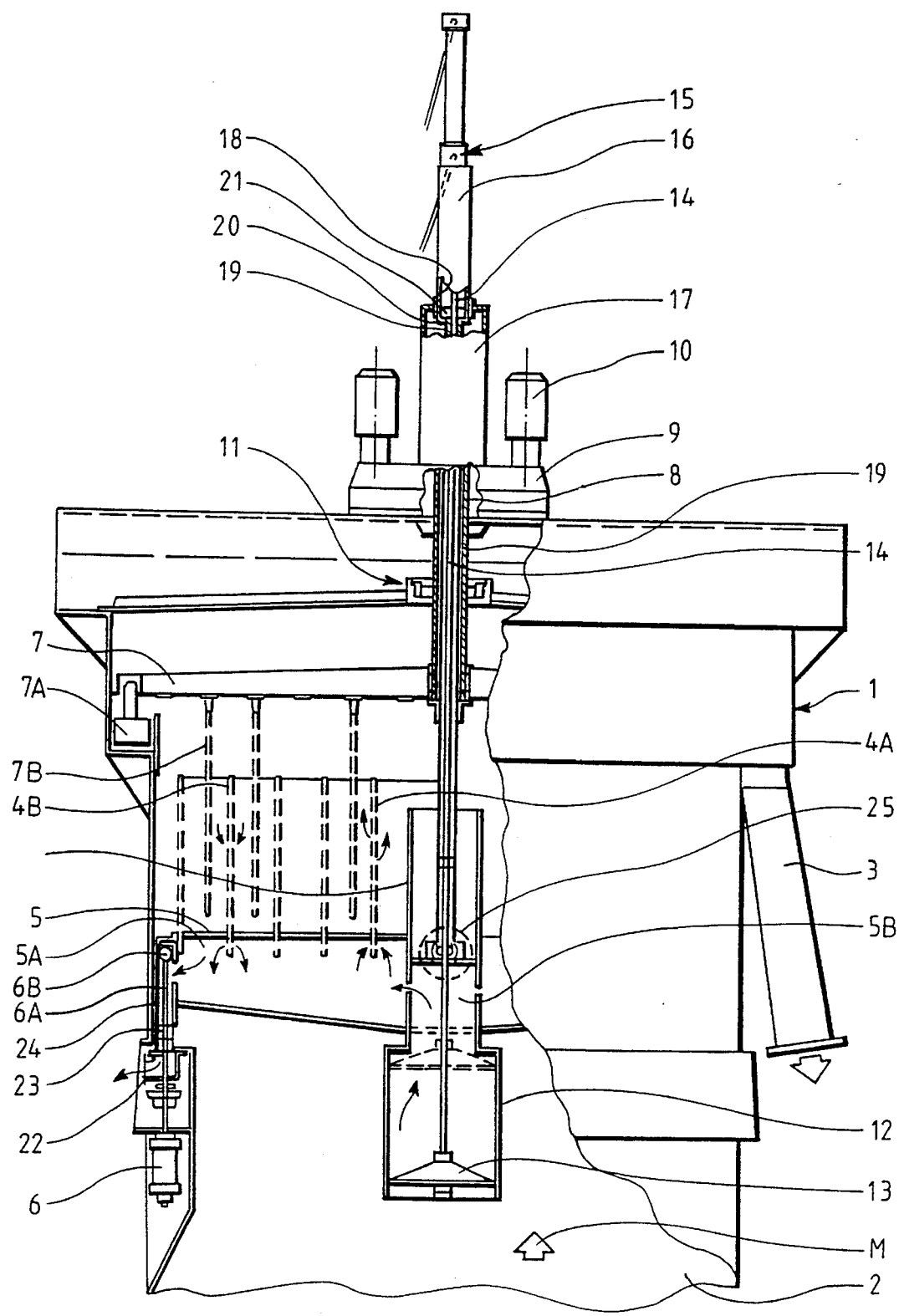
FIG. 1 shows the essential details of a screening device according to the invention in vertical longitudinal section.

FIG. 1 shows a screening device for washing pulp. The screening device consists of a housing 1 inside which the pulp M is fed from below and upwards through its lower cavity 2. After washing, the pulp is fed out through an outlet 3. Screening members 4 in the form of several ring-shaped, concentric, hollow elements 4A, 4B, are arranged on the supporting member 5. The supporting member 5 consists of several hollow arms, inside which are formed channels 5A, 5B, and is movable in the vertical direction with the aid of hydraulic pistons 6 which are fixed to the lower part of the housing and which, via a piston rod 6A, act on a ball joint 6B at the outer periphery of the supporting member 5. Above the screening assembly 4 there are rotating arms 7 fixed to a rotary sleeve 8. The arms 7 support scrapers 7A and members 7B for supplying washing liquid. The rotary sleeve 8 is mounted inside a cylindrical unit 17 and is rotated by means of motors 10 and a transmission unit 9. The sleeve 8 is held centred with the aid of a bearing unit 11 supported by a console.

Underneath the supporting member 5 there is a cylindrical container 12, which is open both at the bottom and at the top. A piston member 13 is arranged movably inside the container 12. The piston member 13 is moved with the aid of an hydraulic unit 15 by means of an extended piston rod 14. The cylinder for the hydraulic unit 15 is arranged above a cylindrical housing 16 which is telescopically displaceable inside a lower, larger cylindrical housing unit 17 which is fixed at the upper end of the screening device. The upper cylindrical unit 16 is firmly connected 20 to an extended pipe 19 which is connected to the supporting member 5 via a specially constructed ball joint 25.

As already indicated, liquid can be supplied with the aid of the members 7B arranged on the rotating arm 7. Removal of liquid can take place from the cavity 5A inside the supporting member 5 through several outlets 22 and in between via telescopically displaceable cylinder housings 23, 24.

Figure 2:
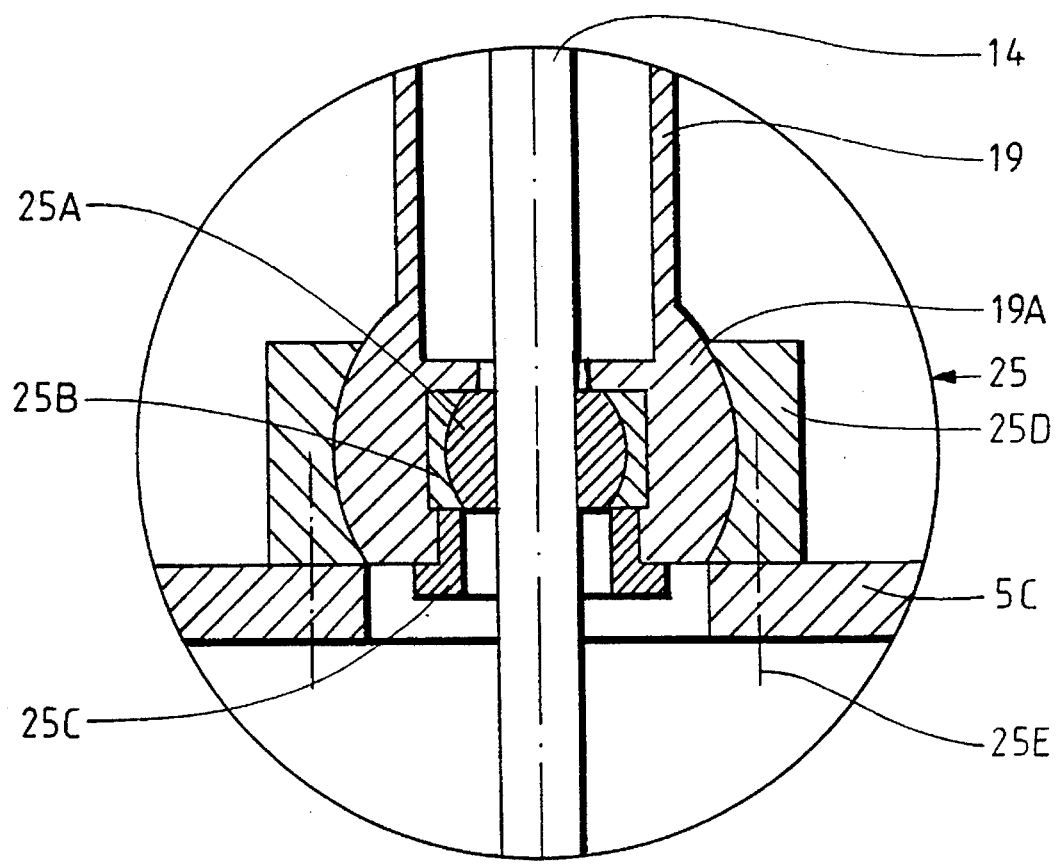
FIG. 2 shows a specific solution according to the invention for arranging the point of application of the reaction forces from the hydraulic piston unit.

FIG. 2 shows in detail the special design of the mounting point 25 for the pipe 19 which transmits the reaction forces from the hydraulic piston unit 15 to the supporting member 5. At the very bottom of the pipe 19, a rotationally symmetrical sphere 19A is arranged inside a corresponding rotationally symmetrical female part 25D lying outside it. This female part 25D is connected, with the aid of suitable means 25E, for example screws, to a central part 5C of the supporting member 5. The rod 14 for the piston member 13 is arranged centrally inside the said joint 25 with the aid of a ball joint packing 25A, 25B inside which the rod 14 can slide in a sealing manner and can even be permitted to flex.

The screening device according to the invention functions in a known manner by the pulp which is to be washed being fed in at the bottom 2 and moving continuously upwards through the housing 1. Washing liquid is supplied with the aid of the spraying members 7B, and liquid is drawn off by drawing off liquid through the screening rings 4 down into the cavity 5A inside the supporting members 5 and out through the orifice 22. Pulp M is the whole time fed out continuously through the outlet 3 with the aid of the rotating scraping members 7A. During the greater part of the described process, the supporting member 5 accompanies the pulp in an upwardly directed movement by the hydraulic units 6 continuously moving the supporting member 5 upwards. Once the screening members 4 and supporting members 5 have reached their upper terminal position, they must be quickly moved down to their lower terminal position. It is important that the pulp bed which has built up round the screening rings is not dragged down (destroyed) in connection with this downwardly directed movement.

By flushing liquid backwards, i.e. upwards and out, through the screening rings 4A a short while before the screening assembly 4 and supporting members 5 are moved downwards, a liquid layer can be built up between the pulp bed and the screening rings. This in turn makes it possible to carry out the said rapid movement without the pulp bed being carried along. This back-flushing of liquid takes place using the liquid which is collected inside the container 12 underneath the supporting member 5. By means of the hydraulic unit 15, a rapid movement of liquid can therefore be effected out of the container 12, through the central channel 5B and thence out into the cavities 5A inside the supporting arms 5. From here the liquid finally flows into the screening members 4A from the bottom and continues up through these, whereby the said desirable liquid layer is built up between the pulp bed and the screening member 4A. The reaction forces which arise in connection with the back-flushing will therefore, with, a solution according to the invention, directly act against the supporting member 5 in its central part 5C.

The invention is not limited by that which has been demonstrated above, but can be varied within the scope of the subsequent patent claims. Thus, it is obvious to the person skilled in the art that the described solution can also be applied to screening devices intended for other things than pulp and which operate according to similar principles. Additionally, it is obvious that the cylindrical shape is a preferred embodiment, but that other shapes can also be used, such as, for example, housings which are rectangular at least in part, as can units adapted to them.

For the rest, it should be mentioned that the invention is also suitable for use in so-called double diffusers (see, for example, EP 377,427). However, in order to be able to keep the peripheral application points 6B in the same plane as the piston mounting 25 in connection with a diffuser of this type as well, the smaller of the two container units for the back-flushing must be moved down so that it is located inside the larger unit. This then provides space for the said mounting.

I claim:

1. A screening device includes a standing cylindrical container having an inlet and outlet for continuous flow-through of a fibre suspension, said device including a moveable supporting member disposed in said container and which supports hollow screening members for vertical movement with said supporting member, an enclosure connected to said supporting member having opposite open ends and a moveable piston mounted in said enclosure, means for moving said piston comprising a hydraulic drive unit mounted outside of said container and transmission means connected between said hydraulic unit and said supporting member for counteracting the reaction force of the hydraulic unit onto said supporting member.

2. The device as claimed in claim 1 wherein said device includes hydraulic units for driving said supporting member vertically and which each act on said supporting member at a selected application point, said transmission means includes transmission members having a point of application on said supporting member which substantially lie in the same plane as the application points of said hydraulic units which drive said supporting member vertically.

3. The device as claimed in claim 1 wherein said screening member comprises a plurality of circular concentric ring elements.

4. The device as claimed in claim 3 wherein a rotary member is mounted in said container and supports means for supplying washing liquid between said ring elements.

* * * * *